2 Sheets--Sheet 1.

G. W. VAN GORDER.
Sulky-Harrows.

No. 136,564.  Patented March 4, 1873.

Witnesses.  
O. M. Marsh,  
H. F. Cornell.

Inventor.  
G. W. Van Gorder.  
Per Burridge & Co.  
Attys.

AM. PHOTO-LITHOGRAPHIC CO. N.Y. (OSBORNE'S PROCESS.)

2 Sheets--Sheet 2.
G. W. VAN GORDER.
Sulky-Harrows.
No. 136,564.    Patented March 4, 1873.
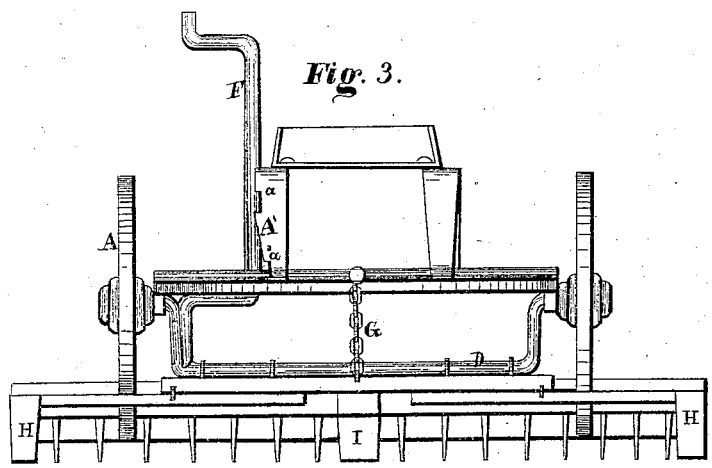
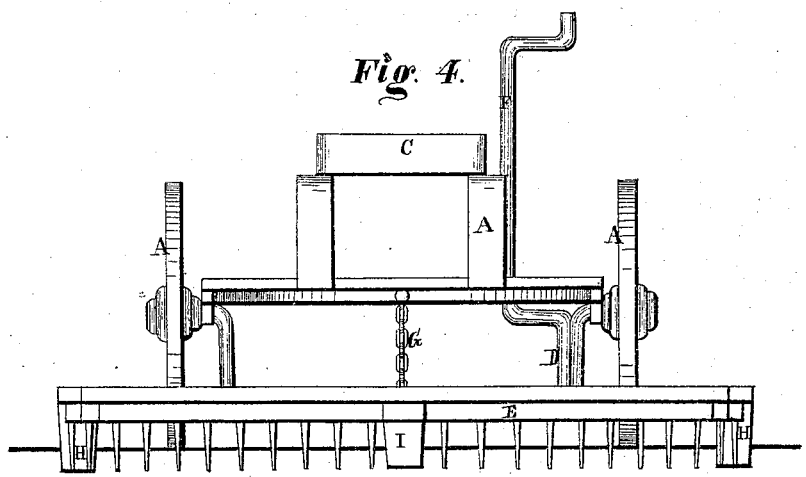
Witnesses.  
O. M. Marsh.  
A. F. Cornell.
Inventor.  
G. W. Van Gorder.  
Per Burridge & Co.  
Attys.

UNITED STATES PATENT OFFICE.

GEORGE W. VAN GORDER, OF WARREN, OHIO.

IMPROVEMENT IN SULKY-HARROWS.

Specification forming part of Letters Patent No. 136,564, dated March 4, 1873.

*To all whom it may concern:*

Figure 1:
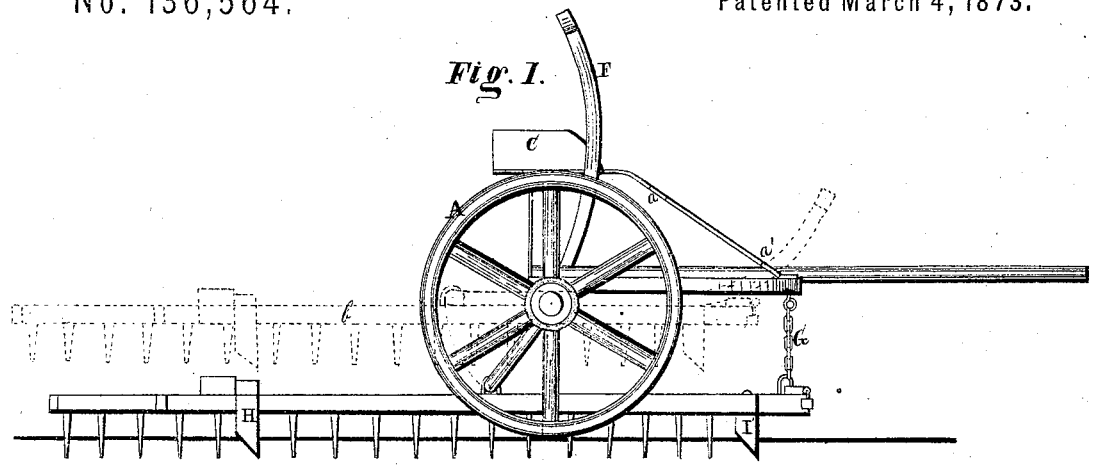
Figure 2:
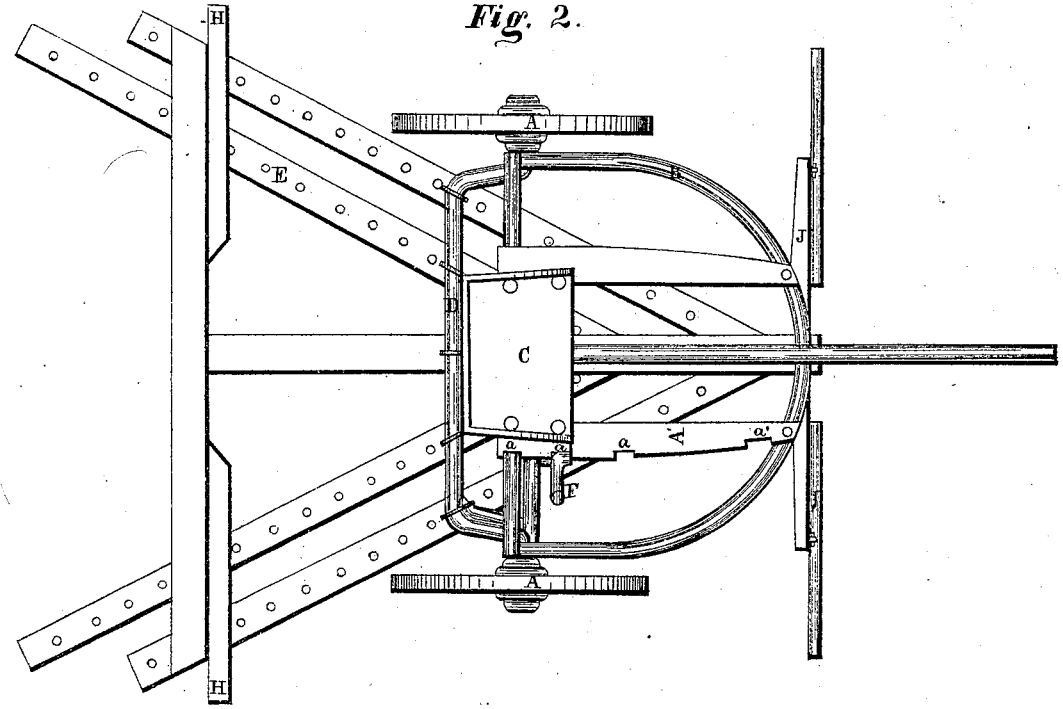

Be it known that I, GEORGE W. VAN GORDER, of Warren, in the county of Trumbull and State of Ohio, have invented a certain new and Improved Sulky-Harrow, of which the following is a description:

Figure 1 is a side view of the machine. Fig. 2 is a plan view. Fig. 3 is a view of the front end. Fig. 4 is a view of the rear end.

Like letters of reference refer to like parts in the several views.

The nature of this invention relates to a harrow attached to a sulky carriage, and combined therewith is a corn-marker; and the object thereof is to facilitate the work of harrowing and relieve the person harrowing from the fatigue of walking while performing the work.

Of the above-said machine the following is a more full and complete description:

The sulky referred to consists of the wheels A, Fig. 2, and frame B, on which is mounted the seat C. The axle-tree of the sulky is bent at right angles back from a direct line of the axis of the wheels, forming a rectangular projection or offset, D, to which is attached in a free manner the harrow E, as shown in Fig. 2. To one end of the offset D is secured a lever, F, Fig. 1, for the purpose of elevating and lowering the harrows, as will presently be shown. G is a chain attaching the front end of the harrow to the frame B. On the rear end of the harrow is secured a foot, H, Figs. 2 and 3, one on each side, as shown in the drawing, and a similar foot, I, is secured to the front end of the harrow. Its lateral position in relation to the feet H is such as to make them some four feet apart, the distance that the rows of corn are to be planted.

The practical operation of the above-described machine is at sight apparent and simple. It is obvious that the harrow is drawn directly by the team, and not indirectly by the sulky; the sulky being drawn along by the harrow.

In this combination of the sulky and harrow the work is more evenly done than it can be without the sulky, as the wheels thereof prevent the harrow from being pushed aside by lumps of dirt, stones, sods, &c.; hence the harrowing is straight and evenly done, and also of a uniform depth, as the lever F confines the harrow to a certain height or grade by being lodged in one of the notches a, Fig. 2, cut in the side of the seat-raiser A'.

The ground being properly harrowed, the machine can now be used for marking it out for corn-planting by attaching the feet or lugs H to the harrow, in the position as above described, and shown in the drawing. The harrow can be moved from place to place on the wheels by raising it to the position indicated by the dotted lines b, Fig. 1, by means of the lever F, which, for this purpose, is forced down to the position shown in Fig. 1, and lodged in the notch a'; in this elevated position of the harrow it can be wheeled away or lifted over obstructions while being in use.

Claim.

What I claim as my invention, and desire to secure by Letters Patent, is—

The frame B and wheels A, axial offset D, and lever F, as constructed and arranged in combination with the harrow E having markers H I, in the manner as and for the purpose set forth.

GEORGE W. VAN GORDER.

Witnesses:
JOHN H. BURRIDGE,
A. F. CORNELL.